United States Patent
Paul et al.

(10) Patent No.: US 10,263,794 B2
(45) Date of Patent: Apr. 16, 2019

(54) MAINTAIN POWER SIGNATURE CONTROLLER AT POWER INTERFACE OF POE OR PODL SYSTEM

(71) Applicant: Linear Technology Corporation, Milpitas, CA (US)

(72) Inventors: Michael Paul, Santa Barbara, CA (US); David M. Stover, Santa Barbara, CA (US); Heath D. Stewart, Santa Barbara, CA (US); Jeffrey L. Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 91 days.

(21) Appl. No.: 15/582,445

(22) Filed: Apr. 28, 2017

(65) Prior Publication Data

US 2017/0338969 A1 Nov. 23, 2017

Related U.S. Application Data

(60) Provisional application No. 62/338,963, filed on May 19, 2016.

(51) Int. Cl.
| | | |
|---|---|---|
| *H04L 12/10* | (2006.01) | |
| *G06F 1/26* | (2006.01) | |
| *H04L 12/40* | (2006.01) | |

(52) U.S. Cl.
CPC ............... *H04L 12/10* (2013.01); *G06F 1/26* (2013.01); *H04L 12/40045* (2013.01)

(58) Field of Classification Search
CPC ....................................................... H04L 12/10

USPC ............................................................. 307/1
See application file for complete search history.

(56) References Cited

U.S. PATENT DOCUMENTS

| | | | |
|---|---|---|---|
| 9,735,577 B2* | 8/2017 | Cerutti | ...................... G05F 3/02 |
| 2008/0137759 A1 | 6/2008 | Cai et al. | |
| 2013/0127481 A1 | 5/2013 | Vladan | |
| 2013/0154603 A1* | 6/2013 | Cerutti | ...................... G05F 3/02 |
| | | | 323/312 |

(Continued)

FOREIGN PATENT DOCUMENTS

| | | |
|---|---|---|
| KR | 1020130057391 | 5/2013 |
| WO | 2015106992 A1 | 7/2015 |

OTHER PUBLICATIONS

EPO, "Extended EP Search Report" dated Aug. 10, 2017, 9 pages.

*Primary Examiner* — Adi Amrany
(74) *Attorney, Agent, or Firm* — Patent Law Group LLP; Brian D. Ogonowsky

(57) ABSTRACT

The invention pertains to systems where DC power is supplied by a PSE to a PD, such as over differential data wire pairs. IEEE standards require a minimum current to be drawn from the PD in order for the PSE to continue supplying the DC voltage. If the PD is in a low power mode, the PSE will normally discontinue supplying the DC voltage, which then requires a new detection and classification routine for powering up again. To avoid this, a "maintain power signature" controller provides a periodic current pulse by a current source connected between the PD input and the PD's full bridge rectifier. Any droop in the DC voltage that reverse biases the full bridge rectifier while the PD is in its low power mode will not affect the current pulse, so the PSE continues to supply the DC voltage.

20 Claims, 6 Drawing Sheets

(56) References Cited

U.S. PATENT DOCUMENTS

| | | | |
|---|---|---|---|
| 2014/0084681 A1* | 3/2014 | Vigna | H04L 12/10 307/12 |
| 2015/0042243 A1* | 2/2015 | Picard | H05B 37/0272 315/307 |
| 2016/0056967 A1* | 2/2016 | Ohana | G06F 1/26 307/1 |
| 2016/0095175 A1* | 3/2016 | Picard | H05B 33/089 315/294 |
| 2017/0012787 A1* | 1/2017 | Horvath | H04L 12/10 |
| 2017/0041153 A1* | 2/2017 | Picard | H04L 12/10 |
| 2017/0054290 A1* | 2/2017 | Di | H02J 7/00 |
| 2017/0085192 A1* | 3/2017 | Agnes | H02M 3/07 |
| 2018/0074567 A1* | 3/2018 | Darshan | H04L 12/40045 |

* cited by examiner

MAINTAIN POWER SIGNATURE CONTROLLER AT POWER INTERFACE OF POE OR PODL SYSTEM

CROSS-REFERENCE TO RELATED APPLICATIONS

This application claims priority to U.S. provisional application Ser. No. 62/338,963, filed May 19, 2016, by Michael Paul et al.

FIELD OF THE INVENTION

This invention relates to systems where DC voltage and differential data are transmitted by the same cable to a Powered Device (PD) load, such as in Power over Ethernet (PoE) or Power over Data Line (PoDL) systems. The invention more particularly relates to satisfying an IEEE requirement in such systems that a minimum PD load current be detected by the Power Sourcing Equipment (PSE) in order for the PSE to continue to supply the DC voltage via the cable to the PD load.

BACKGROUND

In a PoE system, DC voltage is supplied by the PSE over the same wire pairs that carry differential Ethernet data. Alternatively, the DC voltage can be transmitted over the spare wire pairs in a CAT-5 Ethernet cable, while the differential data is transmitted over data wire pairs in the same CAT-5 cable. Similarly, in a PoDL system, only one wire pair is used, and the DC voltage and differential data are transmitted over the same wire pair. Both the PSE and the PD have circuitry (e.g., transformers, inductors, capacitors) that separate out the AC (data) and DC voltage signals transmitted by the wires. The DC voltage powers all the PD components, and the data is processed by a PHY (physical layer component). The various standards are set out in IEEE 802.3 and are well known.

The IEEE standards require a low power handshaking routine prior to the full DC voltage being coupled to the wire pair(s) by the PSE. Such a handshaking routine may include a signature resistance test to determine if the PD presents approximately 25 kOhms at its input, signifying that it is PoE-compatible. If so, a low power classification test may then be performed to identify the power requirements of the PD. If the handshaking routine conveys that the PD is compatible with receiving a DC voltage and the PSE can supply the required power, the PSE supplies the DC voltage to the wires to fully power the PD. The DC voltage may be, for example, about 44 volts, although other voltages may be appropriate depending on the system.

Every time the system is powered up, the handshaking routine must be performed in the event that the PD has been replaced with a non-PoE or non-PoDL system.

The IEEE also specifies a minimum load current (a "maintain power signature") that must be detected by the PSE in order for the PSE to continue to supply the full DC voltage to the PD. If the PD load current goes below the minimum threshold current, the PSE assumes the PD has been disconnected and terminates the DC voltage. The PD may also be required to present a certain minimum capacitance across the wires, which is periodically sensed by the PSE during normal operation, in order for the PSE to continue to supply the DC voltage.

Even if the PD remains connected but goes into a low power sleep mode, causing the minimum current level to not be met, the PSE discontinues the DC voltage and a new handshaking routine must be performed before the DC voltage is again applied. In some applications, the powering up time may be significant, especially if a large capacitor in the PD needs to be charged up before the PD can operate.

To ensure the correct polarity DC voltage is supplied to the PD load, the IEEE standards require a full bridge rectifier between the PD input and the PD load. A smoothing capacitor is typically connected across the output of the rectifier to smooth the DC voltage.

Even if the PD produces a current pulse above the "maintain power signature" (MPS) level within the required period, the current would still have to pass through the full bridge rectifier. In the event that the PD load went into a low power mode and the smoothing capacitor was fully charged up (which would commonly occur), any droop of the input DC voltage below the capacitor voltage would cause the full bridge rectifier to be reverse biased. Hence, the rectifier would block any PD current pulse. This would cause the PSE to miss the current pulse and shut off the DC voltage.

Therefore, what is needed is a PoE or PoDL type system where, if the PD goes into a low power mode and there is an input DC voltage droop (reverse biasing the full bridge rectifier), the PD can still supply a current pulse above the MPS threshold current so that the PSE does not terminate the DC voltage. This will allow a more rapid start up of the PD when the PD is to go into its fully operational mode.

SUMMARY

Instead of relying on the PD load itself to present the required minimum current load to the PSE (specified by the IEEE 802.3 standards) in order for the PSE to continue to supply the DC voltage on the wire pair(s), a novel "maintain power signature" (MPS) controller is connected to the input port of the PD just downstream of the DC decoupling components (transformers or inductors) for presenting the minimum current. The MPS controller is connected upstream of the full bridge rectifier, so any reverse bias of the rectifier (such as due to the DC voltage drooping) does not affect the performance of the MPS controller. In this way, the PD load may go into a low current mode without the PSE discontinuing the DC voltage, even if there is a DC voltage droop that reverse biases the rectifier. Therefore, there will be no delay when the PD is to go into its full operating mode from its low power mode.

The low power mode may be a mode where only the PD's PHY is powered by the PSE voltage (so data can be communicated). Such a current draw may be on the order of 100 microamps, which is well under the MPS current required to be sensed by the PSE in order to continue to supply the DC voltage.

Although the IEEE standards for MPS change over time to adapt to evolving systems, one present MPS standard is that a PD minimum current of 10 mA be present for at least 7 ms over each period of 317 ms, where the PSE constantly monitors the current drawn by the PD. In one embodiment, the novel MPS controller includes a current source generating at least the minimum current, and this low current is intermittently applied across the wire pairs to meet the IEEE MPS standard. Therefore, the PSE continues to supply the DC voltage even if the PD load itself is drawing no current at all in a minimum power state and the DC voltage droops below a capacitor voltage downstream of the full bridge rectifier.

In one embodiment, the MPS controller is always active even if the PD load itself is drawing a current above the MPS minimum current standard. In another embodiment, to improve efficiency, the MPS controller is not active if the PD load draws a current above the MPS minimum current standard.

In one embodiment, the MPS controller current source completely bypasses the full bridge rectifier by coupling the current source across the inputs of the full bridge rectifier. In another embodiment, the MPS controller current source has one terminal directly connected to an input of the full bridge rectifier and draws or returns current through one or more of the rectifying elements, such as diodes or MOSFETs in an active bridge. The current source may also be adjustable for use in different systems with different requirements.

In one embodiment, a sense element detects the current drawn by the PD load and enables or disables the MPS controller depending on if the MPS controller is needed to supply the minimum current. The sense element may be a MOSFET in the full bridge rectifier or a series sense resistor, where the voltage drop across the MOSFET or sense resistor is proportional to the PD load current.

Since the MPS controller current source is inserted prior to the full bridge rectifier, additional rectifiers may be used in the MPS controller to ensure the proper direction of current flow by the current source.

The MPS controller circuit may also include controllers for an active full bridge rectifier since it is already detecting the polarity of the incoming DC voltage at the PD input.

The MPS controller can share information with the active rectifier controller to avoid redundancy. For example, the active rectifier controller may detect the polarity of the incoming DC voltage and tell the MPS controller which wire pair to draw current from and which wire pair to return current to. The MPS controller may tell the active rectifier controller to cease active functioning (i.e., cease controlling the rectifying MOSFETs) and to use the MOSFETs internal diodes to reduce power consumption when it is determined that the PD is in a low power mode. The MPS controller then supplies the low current pulses to the wire pairs to cause the PSE to continue supplying power.

A PD controller performs various other functions, such as performing the handshaking routine and closing a switch to couple the DC voltage to the PD load (or a DC/DC converter). The full bridge rectifier, the MPS controller, and the PD controller may be formed as a single chip so there is no added expense or complexity by adding the MPS controller to the system.

The MPS controller concepts can be adapted for PoE (two or more wire pairs) or PoDL (single wire pair).

Other embodiments are disclosed.

BRIEF DESCRIPTION OF THE DRAWINGS

Elements that are the same or equivalent in the various figures are labeled with the same numeral.

DETAILED DESCRIPTION

Although the MPS controller is described within a PoE system that uses both data wire pairs and spare wire pairs in a CAT-5 cable to conduct DC voltage, the MPS controller may be used in a PoE system that conducts the DC voltage over only the data wire pairs (along with differential Ethernet data) or only over the spare wire pairs (typically not conducting differential data). Additionally, the MPS controller may be used in a PoDL system that uses only a single wire pair to conduct both the DC voltage and differential data.

Figure 1:
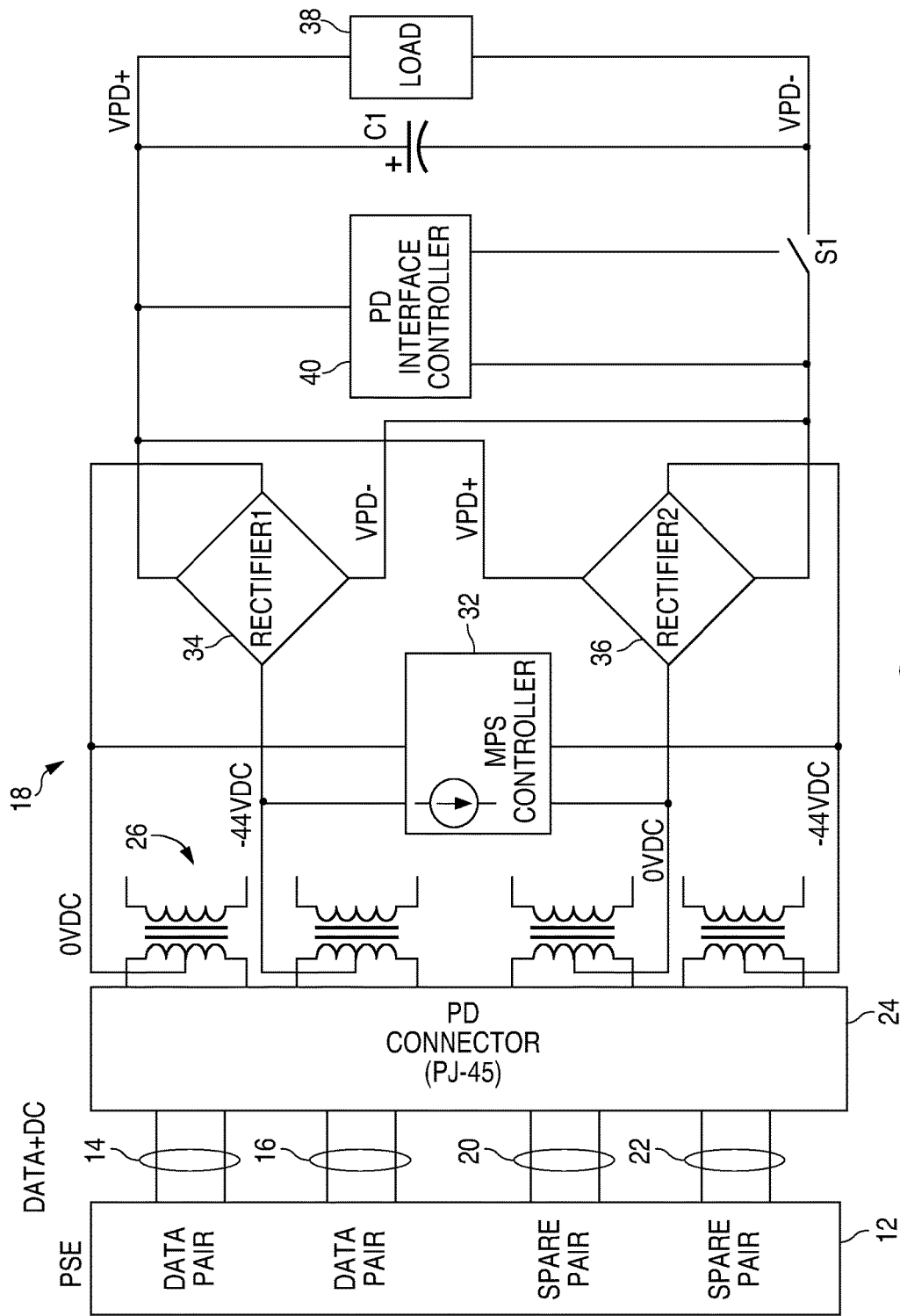
FIG. 1 illustrates a PoE system where DC voltage is supplied by a PSE to a PD via two sets of wire pairs, and where an MPS controller is connected in the PD between the DC de-coupling transformers and the full bridge rectifier, in accordance with one embodiment of the invention.

In FIG. 1, a conventional PSE 12 supplies a DC voltage, such as 44 volts, as a common mode voltage across two sets of twisted data wire pairs 14 and 16. To accommodate legacy telephone equipment that uses a negative voltage and zero volts, the PSE 12 may supply 0 volts on one data wire pair and −44 volts on the other data pair. The DC voltage may be typically up to 57 volts. In other systems, the voltage may be much lower, such as 8 volts. The data wire pair 14 may also carry differential transmit data, and the data wire pair 16 may also carry differential receive data to reduce collisions.

In order to supply more power to the PD 18 and minimize the voltage drop along the wires, the same DC voltage may also be applied across two sets of twisted spare wire pairs 20 and 22. The spare wire pairs 20 and 22 may or may not carry differential data.

The four wire pairs terminate in a PD connector 24, which is typically a socket for a RJ-45 plug at the end of a CAT-5 cable.

Center-tapped transformers 26 de-couple the common mode DC voltage from the differential data. The differential data is then applied to a conventional PHY (not shown) in the PD 18 for processing the differential data. A PHY may or may not be connected to the spare wire pairs 20 and 22, depending on the application. The data processing aspect of the system is not relevant to the invention and may be conventional.

Although the DC voltage on the wire pairs may be either polarity, FIG. 1 identifies an example of the polarities by identifying voltages as either 0 volts or −44 volts. The voltage magnitudes are arbitrary.

An MPS controller 32 is shown connected to the center taps of the four transformers 26 so as to bypass the full bridge rectifiers 34 and 36, which rectify the incoming DC voltage for the PD load 38. The MPS controller 32 includes a timer and a current source (described later) to draw and return a current through the wire pairs that exceeds the minimum current required by the PSE 12 in order for the PSE 12 to continue supplying the DC voltage. The IEEE standards for such a minimum current is evolving, but we will assume that the minimum current is 10 mA for at least 7 ms over each period of 317 ms, where the PSE 12 constantly monitors the current drawn by the PD 18. The timer supplies the required pulses to the current source to exceed the minimum required current and "on" times so that the PSE 12 constantly supplies the DC voltage even if the PD 18 goes into a low power mode.

The PD 18 may present at least a minimum capacitance and/or a signature resistance to the PSE 12 so the PSE 12 can ensure the PD 18 is still physically connected even if the PD load 38 is drawing substantially no power.

The PSE 12 initially supplies the DC voltage to the wire pairs only if the PD is PoE-compatible, as determined by a conventional low-power detection and classification routine (a handshaking routine). The MPS controller 32 does not affect the handshaking routine. The detection signature may be a 25 kOhm resistor presented by the PD controller 40 across the outputs of the full bridge rectifiers 34 and 36. The PD controller 40 also performs the classification routine to identify at least the power requirements of the PD 18. Once the PSE 12 supplies the full DC voltage, the PD controller 40 detects that the voltage is above a threshold and then closes a switch S1 to couple the full voltage to the PD load 38. The PD load 38 may contain a DC/DC converter for converting the incoming DC voltage to an operating voltage for its various components. A smoothing capacitor C1 smooths the rectified voltage and will be charged to the full DC voltage.

If the PD load 38 is in a low power mode, the PD load 38 will not draw substantial current from the capacitor C1, so the voltage across the capacitor C1 remains high for a time. If the incoming DC voltage droops even a small amount, the rectifiers 34 and 36 will be reversed biased. If the MPS controller 32 were coupled between the rectifiers 34/36 and the PD load 38, the MPS controller current source would then only draw current from the capacitor C1 and not the PSE 12. As a result, the PSE 12 would detect no current being drawn and terminate the DC voltage, in accordance with the IEEE standards. Therefore, a new handshaking routine and capacitor charging would have to be performed before the PD load 38 could resume normal operations. This may add a significant delay.

Since, in the present invention, the current source in the MPS controller 32 is located upstream from the full bridge rectifiers 34 and 36, any reverse conductance of the rectifiers due to a DC voltage droop will not affect the detection by the PSE 12 of the current drawn by the current source in the MPS controller 32.

Figure 2:
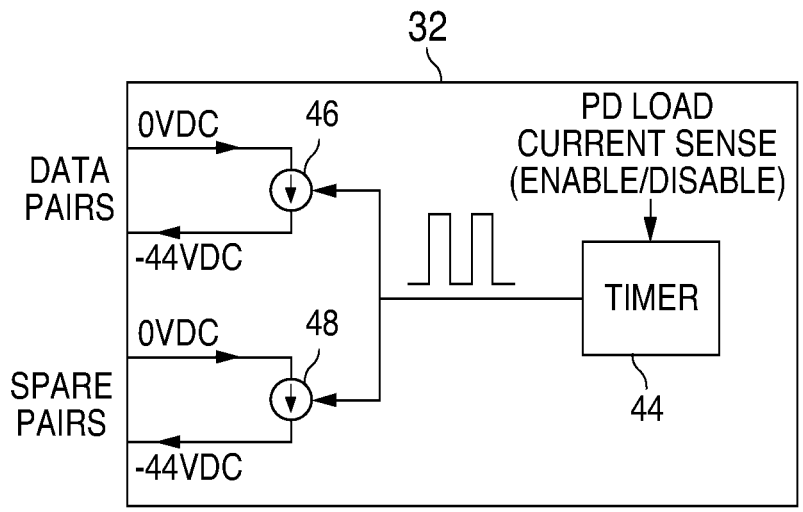
FIG. 2 illustrates more detail of the MPS controller of FIG. 1.

Although, the current source in the MPS controller 32 may draw any amount above the minimum current needed for the PSE 12 to keep supplying the DC voltage, it is more energy efficient to supply the current in pulses. FIG. 2 illustrates an example of the MPS controller 32 where a timer 44 supplies a periodic pulse to a pair of voltage controlled current sources 46 and 48 to provide at least the minimum current needed to be detected by the PSE 12. In one embodiment, the timer pulses have a width greater than 7 ms and a period not exceeding 250 ms to meet the IEEE minimum current requirement. The magnitude of the pulses is such that the voltage controlled current sources 46 and 48 each draw at least 10 mA to meet the IEEE minimum current requirement. Although a voltage controlled current source is shown, the current source may instead draw a fixed current, and the timer pulse controls a switch that connects the current source across the wire pairs for the required times.

Figure 3:
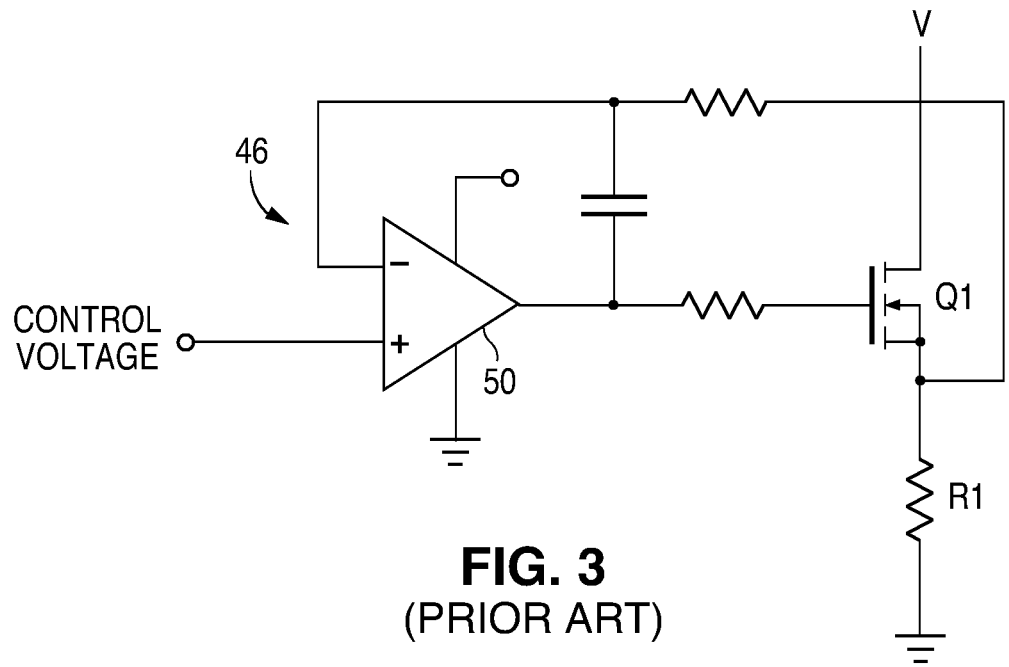
FIG. 3 illustrates a conventional voltage controlled current source which may be the current source used in the MPS controller of FIG. 2.

FIG. 3 illustrates a conventional voltage controlled current source 46 that may be used. The operation of the voltage controlled current source 46 is well known. The operational amplifier 50 supplies enough voltage to the gate of the MOSFET Q1 to cause the voltage drop across the resistor R1, proportional to the current, to equal the control voltage at the input of the operational amplifier 50.

Figure 4:
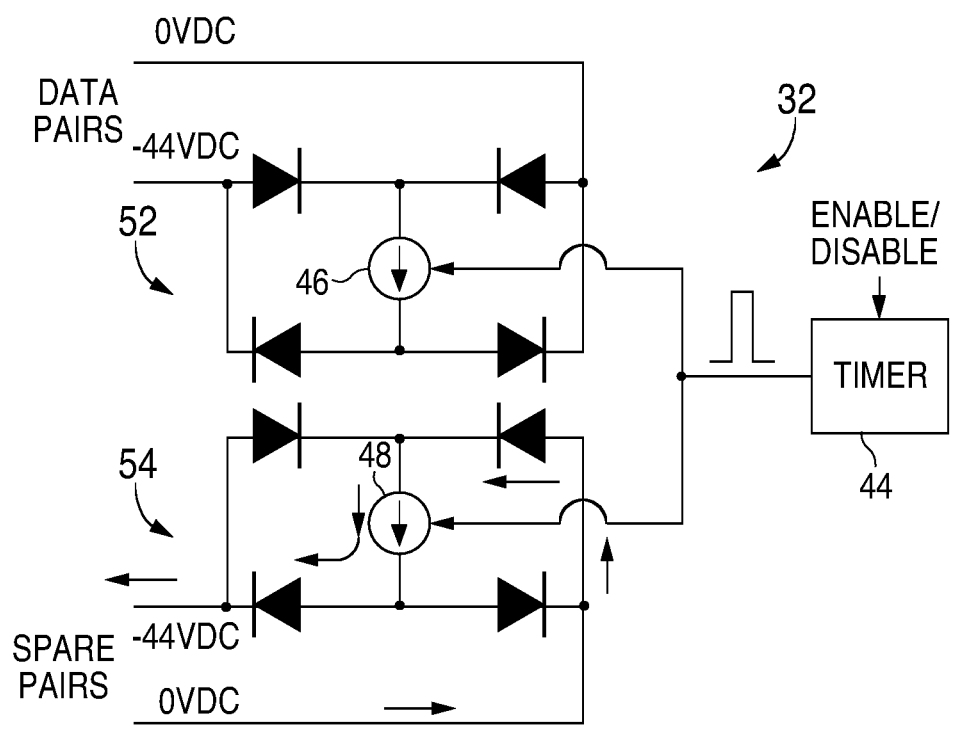
FIG. 4 illustrates an embodiment of the MPS controller having a full bridge rectifier, separate from the full bridge rectifier of FIG. 1, to ensure the current source is properly connected to the wire pairs irrespective of the polarity of the DC voltage from the PSE.

The PSE 12 may apply the DC voltage to the wire pairs in either of two polarities. Therefore, the MPS controller current source should be able to draw current from the PSE 12 with either polarity. FIG. 4 illustrates full bridge rectifiers 52 and 54 for the data wire pairs and the spare wire pairs within the MPS controller 32. The diodes in the rectifiers ensure that the incoming DC voltage from the PSE 12 is properly rectified so that the current sources 46 and 48 draw and return current in the proper direction. Arrows are shown within the rectifier 54 illustrating the direction of current through the forward biased diodes. The rectifiers 52 and 54 are separate from the rectifiers 34 and 36 in FIG. 1.

Figure 5:
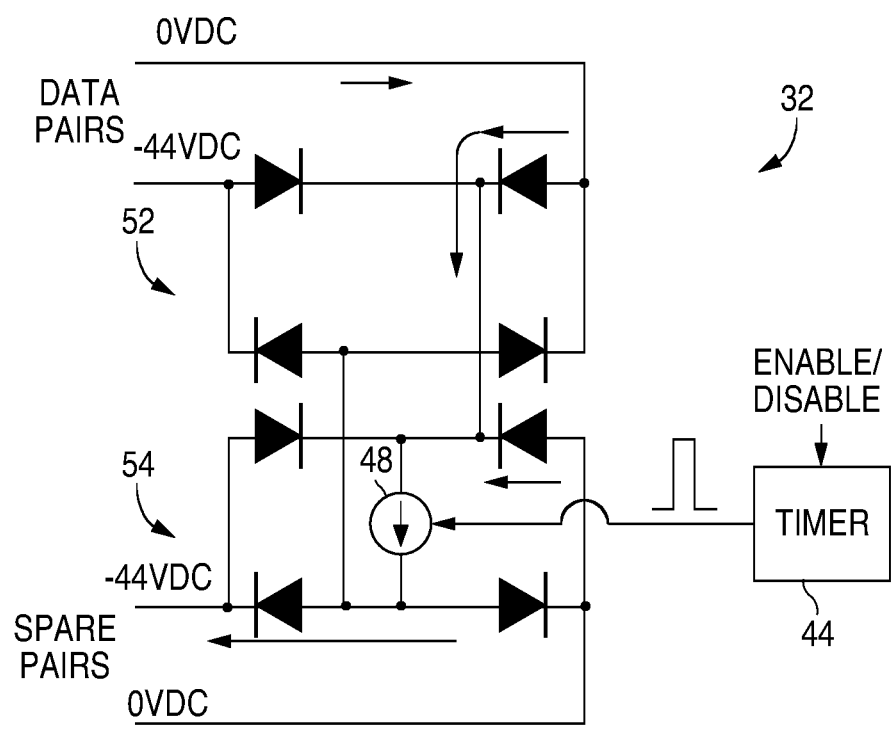
FIG. 5 is similar to FIG. 4 but illustrates how a single current source may be used for drawing the minimum current through data pairs and spare pairs.

FIG. 5 illustrates how only one current source 48 is required in the configuration shown. In FIG. 5, current is drawn through the data wire pair (at 0VDC) and returned through the spare wire pair (at −44VDC).

Figure 6:
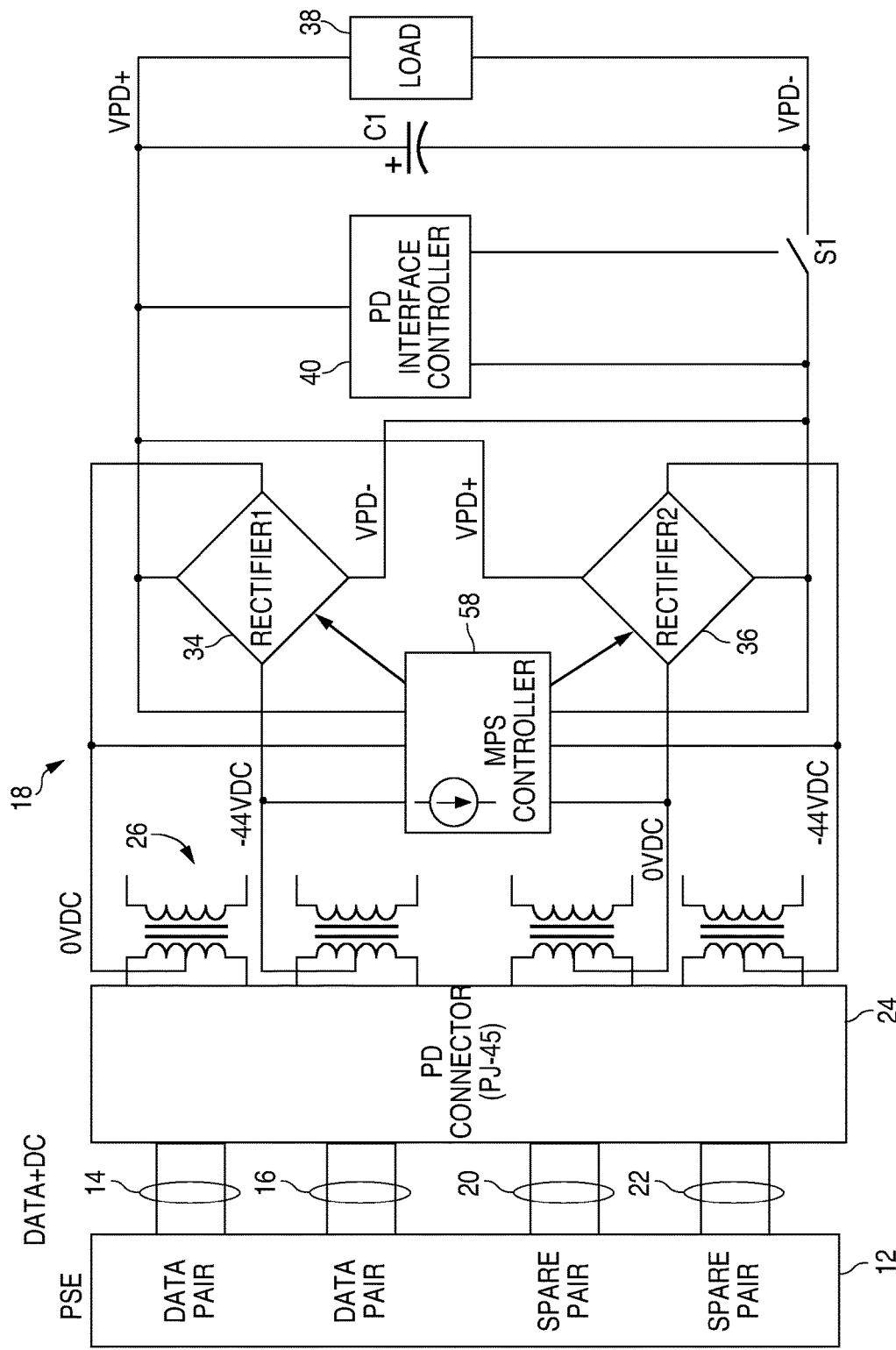
FIG. 6 illustrates how the MPS controller may also control MOSFETs in an active full bridge rectifier, since the MPS controller is coupled to the incoming DC voltage and must first determine the polarity in order to properly apply the current source across the wire pairs.

FIG. 6 illustrates how the full bridge rectifiers 34 and 36 may be conventional active rectifiers (using MOSFETs as the rectifying elements), and the control of the MOSFETs is controlled by the MPS controller 58. Since the MPS controller 58 receives the DC voltage at its original polarity, it can determine the polarity and control the MOSFETs in the rectifiers 34 and 36 to create the proper polarity at the PD load 38. Active rectifiers are well known and use comparators to compare the incoming voltage potentials to determine the polarity. The outputs of the comparators are then used to turn on one of the high side MOSFETs and one of the low side MOSFETs to output the desired polarity. Such comparators and gate drivers are in the MPS controller 58.

Figure 7:
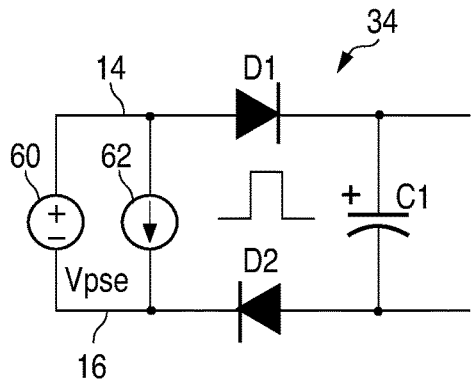
FIG. 7 illustrates how the MPS controller current source completely bypasses the full bridge rectifier in FIG. 1.

FIG. 7 is a simplified illustration showing the PSE voltage source 60 being coupled to the data wire pairs 14 and 16 and how the current source 62 in the MPS controller is connected to only the inputs of the full bridge rectifier, such as the rectifier 34 in FIG. 1, where the diodes D1 and D2 represent the forward biased diodes in the rectifier 34.

Figure 8:
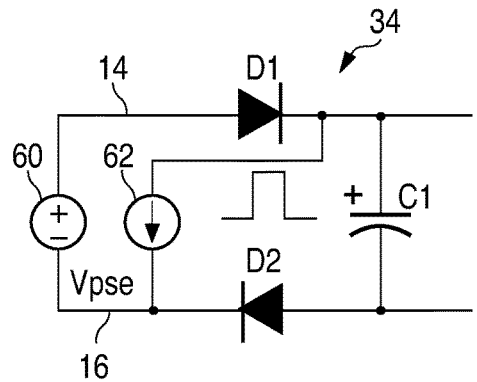
FIG. 8 illustrates how the MPS controller current source may draw current through one of the forward biased rectifiers in the full bridge rectifier while still achieving all of its benefits.

FIG. 8 illustrates a variation of FIG. 7 where the high side terminal of the current source 62 is connected to one forward biased diode output of the rectifier 34 and the low side terminal of the current source 62 is connected to one forward biased diode input of the rectifier 34. The current through the current source 62 is guaranteed to flow through the diode D1 regardless of any voltage droop, despite the smoothing capacitor C1 being fully charged and the PD being in a low power mode. This is because the current source 62 is blocked by diode D2 from drawing current from the capacitor C1. The diode D1 will be forward biased by the current source 62.

Figure 9:
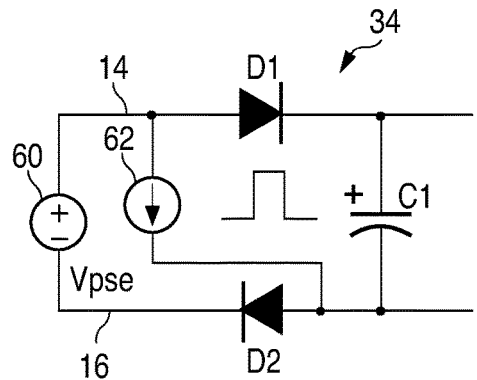
FIG. 9 illustrates how the MPS controller current source may return current through one of the forward biased rectifiers in the full bridge rectifier while still achieving all of its benefits.

FIG. 9 is similar to FIG. 8 but where the low side terminal of the current source 62 is connected to one forward biased diode output of the rectifier 34 and the high side terminal of the current source 62 is connected to one forward biased diode input of the rectifier 34. The current through the current source 62 is guaranteed to flow through the diode D2 regardless of any voltage droop, despite the smoothing capacitor C1 being fully charged and the PD being in a low power mode. This is because the current source 62 is blocked by diode D1 from drawing current from the capacitor C1. The diode D2 will be forward biased by the current source 62.

Figure 10:
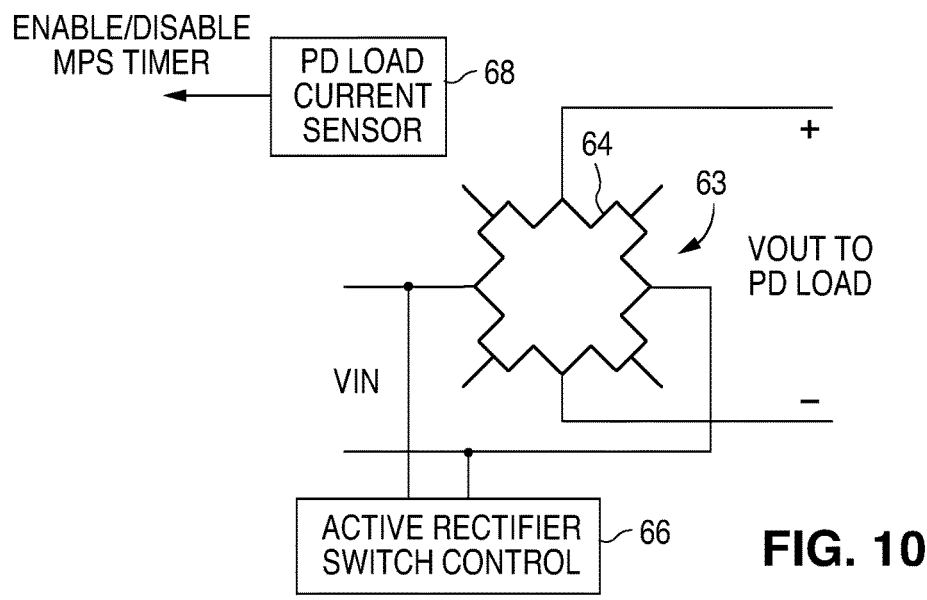
FIG. 10 illustrates an active full bridge rectifier for presenting the proper polarity DC voltage to the PD load, where the PD load current is sensed and, if the load current falls below a threshold, the MPS controller current source is enabled.

FIG. 10 illustrates an active full bridge rectifier 63 which may be used as the rectifier 34 or 36 in FIG. 6. MOSFETs 64 are switched based on the polarity of the incoming voltage. An active rectifier switch control circuit 66 contains comparators that compare the magnitudes of the incoming voltage potentials to detect the polarity and control the MOSFETs 64 accordingly to output the correct polarity voltage. Such control circuits are well known and conventional. An active rectifier can improve efficiency by avoiding the voltage drop of a diode.

If an active full bridge rectifier is employed as the rectifier 34 in FIG. 6, power is used up by switching the MOSFET gates on and off due to the gates' capacitance. If the PD is in a low power mode, it is desirable to conserve power where possible. In such an event, it is desirable to keep all the MOSFETs 64 off and only use their body diodes to output the correct polarity of the DC voltage. A PD load current sensor 68 detects the PD load current, such as by using a low value sense resistor in series with the PD load or a voltage drop across one of the "on" MOSFETs 64. If the load current is above a threshold, such as measured by a comparator, there is no need for the MPS controller to supply the minimum current. Therefore, the current sensor 68 disables the timer 44 (FIG. 2) when the PD load current is above the threshold that keeps the PSE 12 supplying the DC voltage. When the PD load current goes below the threshold, the sensor 68 enables the timer 44 to provide the current pulses needed to keep the PSE 12 supplying the DC voltage.

Figure 11:
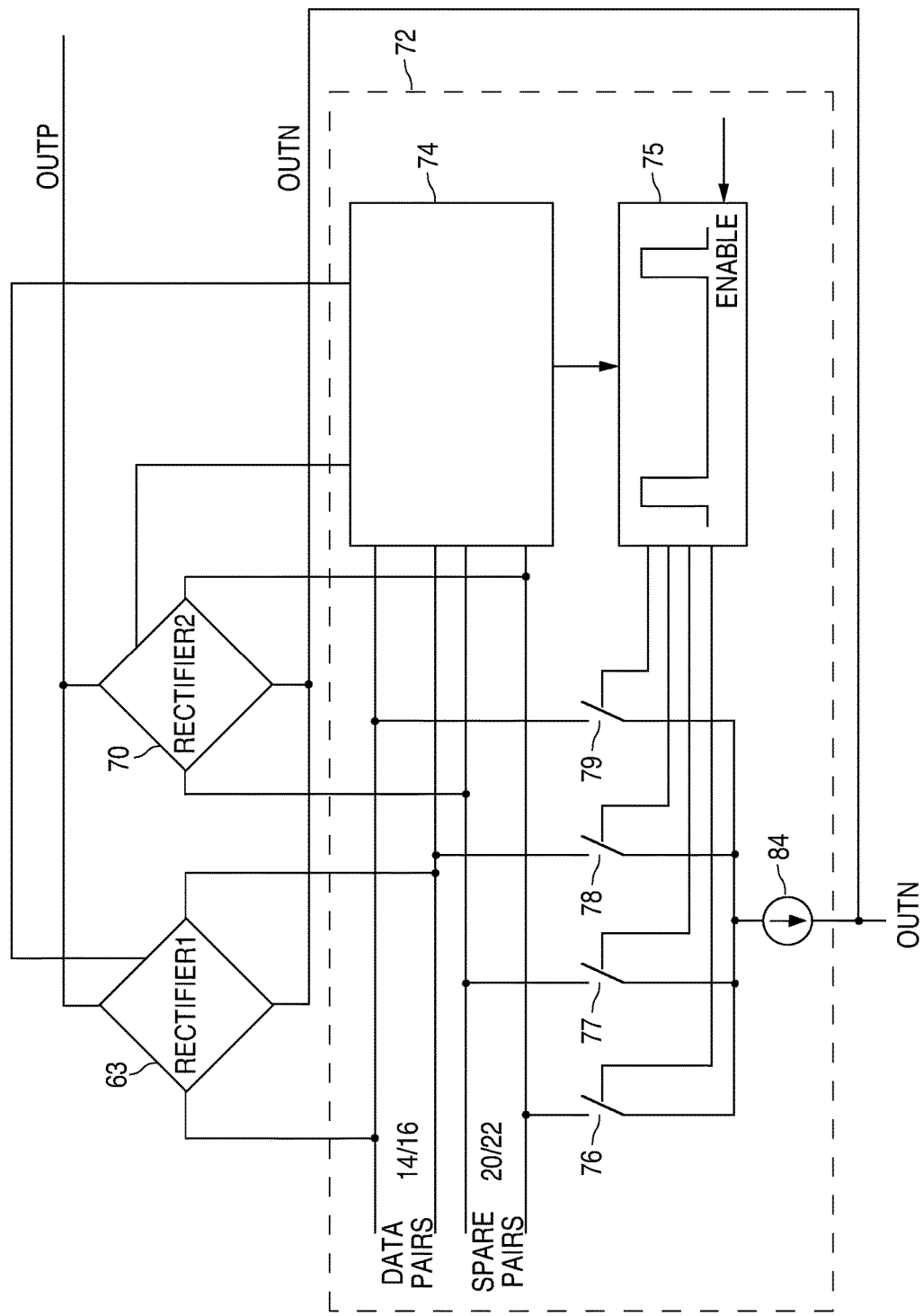
FIG. 11 illustrates an embodiment where the MPS controller includes an active full bridge rectifier controller, where the rectifier controller detects the polarity of the incoming DC voltage and the magnitude of the PD load current to: 1) allow the MPS controller current source to be properly connected to the wire pairs; 2) allow the active rectifiers to turn off in a low power mode to save power; and 3) allow the MPS controller current source to be enabled only in the PD's low power mode to save power.

FIG. 11 illustrates an embodiment where the full bridge rectifiers 63 and 70 are active rectifiers, using MOSFETs, and the MPS controller 72 includes an active full bridge rectifier controller 74, a timer 75, switches 76-79, and a current source 84. The outputs OUTP and OUTN of the rectifiers 63 and 70 are applied to the PD load. The incoming DC voltage on the wire pairs 14/16 and 20/22 may be either polarity. The rectifier controller 74 not only detects the incoming polarity (using conventional comparators) and controls the rectifier MOSFETs to output the correct polarity from the rectifiers 63 and 70, but also identifies the proper switches 76-79 that are to be switched by the timer 75 to draw current through. In the configuration shown, the current source 84 must have its high side terminal connected to the positive voltage on the wire pairs 14/16 and 20/22. The rectifier controller 74 identifies which wire pairs carry the positive DC voltage. The low side terminal of the current source 84 is connected to the low side output of the rectifiers 63/70, which is the return path to the PSE, similar to the connection shown in FIG. 9. If the PD load current goes below a threshold current, described with respect to FIG. 10, the timer 75 is enabled and only intermittently switches on the switches 76-79 that are connected to the positive voltage wire pairs. At the same time, the rectifier controller 74 may disable the MOSFETs in the rectifiers 63 and 70 to save power. Therefore, a separate full bridge rectifier in the MPS controller, shown in FIGS. 4 and 5, is not needed. This improves efficiency and reduces the size of the circuit.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. A Powered Device (PD) for use in a system for supplying power and differential data over at least one wire pair, wherein DC power is supplied by a Power Sourcing Equipment (PSE) to the PD via the at least one wire pair, and wherein the PSE is configured to cease providing the DC voltage on the at least one wire pair if a current drawn by the PD is below a first threshold current, the PD comprising:
    a first DC de-coupling circuit in the PD coupled to the at least one wire pair for de-coupling a DC voltage from the at least one wire pair;
    a first full bridge rectifier in the PD coupled to receive the DC voltage from the first DC de-coupling circuit and output a predetermined polarity of the DC voltage; and
    a first current source in the PD having at least a first terminal coupled to the at least one wire pair between the first DC de-coupling circuit and the first full bridge rectifier, and
    wherein the first current source is configured to draw current from the at least one wire pair above the first threshold current even if a PD load downstream from the first full bridge rectifier draws a current less than the first threshold current.

2. The PD of claim 1 wherein the first current source is a voltage controlled current source coupled to a timer, wherein the timer is configured to generate pulses for controlling a magnitude of current pulses output from the first current source.

3. The PD of claim 1 wherein the first current source is coupled to the at least one wire pair via a switch controlled by a timer, wherein the timer is configured to generate pulses for controlling the switch to cause the first current source to draw current pulses from the at least one wire pair.

4. The PD of claim 1 wherein a second terminal of the first current source is coupled to the at least one wire pair through a conducting rectifier in the first full bridge rectifier in the PD.

5. The PD of claim 1 further comprising:
    a current sensor configured to detect current drawn by the PD; and
    a controller for the first current source;
    wherein, when the detected current drawn by the PD goes below a predetermine level, the controller controls the first current source to draw current from the at least one wire pair above the first threshold current.

6. The PD of claim 1 further comprising:
    a controller for the first current source;
    the controller comprising a second full bridge rectifier coupled to the first DC de-coupling circuit in the PD for connecting the first current source to the at least one wire pair in a correct polarity.

7. The PD of claim 6 wherein the second full bridge rectifier is an active full bridge rectifier, and the controller is configured to detect a polarity of the DC voltage from the at least one wire pair and control switches in the active full bridge rectifier.

8. The PD of claim 1 wherein the at least one wire pair is a single wire pair.

9. The PD of claim 1 wherein the at least one wire pair comprises two wire pairs, where a first wire pair carries a first DC potential, and a second wire pair carries a second DC potential, wherein the DC voltage is the difference between the first DC potential and the second DC potential.

10. The PD of claim 1 wherein the at least one wire pair comprises four wire pairs, where a first wire pair carries a first DC potential, a second wire pair carries a second DC potential, a third wire pair carries the first DC potential, and a fourth wire pair carries the second DC potential, wherein the DC voltage is the difference between the first DC potential and the second DC potential, and wherein the first current source is coupled across the first wire pair and the second wire pair, wherein the PSE is configured to cease providing the DC voltage across the third wire pair and the fourth wire pair if the current drawn by the PD is below the first threshold current, the PD further comprising:
a second DC de-coupling circuit in the PD coupled to the third wire pair and the fourth wire pair for de-coupling the DC voltage from the third wire pair and the fourth wire pair;
a second full bridge rectifier in the PD coupled to receive the DC voltage from the second DC de-coupling circuit and output a predetermined polarity of the DC voltage; and
a second current source in the PD having at least a first terminal coupled to the second DC de-coupling circuit and the second full bridge rectifier, and
wherein the second current source is configured to draw current from one of the third wire pair or the fourth wire pair above the first threshold current even if the PD load downstream from the second full bridge rectifier draws a current less than the first threshold current.

11. The PD of claim 1 wherein the at least one wire pair comprises four wire pairs, where a first wire pair carries a first DC potential, a second wire pair carries a second DC potential, a third wire pair carries the first DC potential, and a fourth wire pair carries the second DC potential, wherein the DC voltage is the difference between the first DC potential and the second DC potential, and wherein the first current source is coupled across the first wire pair and the second wire pair, the system further comprising:
a second DC de-coupling circuit in the PD coupled to the third wire pair and the fourth wire pair for de-coupling the DC voltage from the third wire pair and the fourth wire pair; and
a second full bridge rectifier in the PD coupled to receive the DC voltage from the second DC de-coupling circuit and output a predetermined polarity of the DC voltage;
wherein the first current source in the PD is coupled across the first DC de-coupling circuit and the second DC de-coupling circuit in a proper polarity.

12. The PD of claim 11 further comprising a third full bridge rectifier coupled to the first DC de-coupling circuit for connecting the first current source to the at least one wire pair in a correct polarity.

13. The PD of claim 12 wherein the third full bridge rectifier comprises diodes.

14. The PD of claim 12 wherein the third full bridge rectifier comprises active switches.

15. The PD of claim 11 further comprising a fourth full bridge rectifier coupled to the second DC de-coupling circuit for connecting the first current source to the at least one wire pair in the correct polarity.

16. A method performed by a system for supplying power and differential data over at least one wire pair, wherein DC power is supplied by a Power Sourcing Equipment (PSE) to a Powered Device (PD) via the at least one wire pair, the method comprising:
de-coupling a DC voltage from the at least one wire pair using a first DC de-coupling circuit in the PD coupled to the at least one wire pair;
applying the DC voltage from the de-coupling circuit to a first full bridge rectifier in the PD, where the full bridge rectifier outputs a predetermined polarity of the DC voltage; and
applying current from a first current source in the PD to at least a first terminal coupled to the at least one wire pair between the first DC de-coupling circuit and the first full bridge rectifier,
wherein the PSE is configured to cease providing the DC voltage on the at least one wire pair if a current drawn by the PD is below a first threshold current, and
wherein the first current source is configured to draw current from the at least one wire pair above the first threshold current even if a PD load downstream from the first full bridge rectifier draws a current less than the first threshold current.

17. The method of claim 16 wherein a second terminal of the first current source is coupled to the at least one wire pair through a conducting rectifier in the first full bridge rectifier in the PD.

18. The method of claim 16 further comprising:
controlling the first current source using a controller;
the controller comprising a second full bridge rectifier coupled to the first DC de-coupling circuit in the PD for connecting the first current source to the at least one wire pair in a correct polarity.

19. The method of claim 18 wherein the second full bridge rectifier is an active full bridge rectifier, and the controller is configured to detect a polarity of the DC voltage from the at least one wire pair and control switches in the active full bridge rectifier.

20. A Powered Device (PD) for use in a system for supplying power and differential data over at least one wire pair, wherein DC power is supplied by a Power Sourcing Equipment (PSE) to the PD via the at least one wire pair, and wherein the PSE is configured to cease providing the DC voltage on the at least one wire pair if a current drawn by the PD is below a first threshold current, the PD comprising:
a decoupling means in the PD coupled to the at least one wire pair for de-coupling a DC voltage from the at least one wire pair;
a rectifying means in the PD coupled to receive the DC voltage from the decoupling means and output a predetermined polarity of the DC voltage; and
a means for supplying a current in the PD having at least a first terminal coupled to the at least one wire pair between the decoupling means and the rectifying means, and
wherein the means for supplying the current is configured to draw current from the at least one wire pair above the first threshold current even if a PD load downstream from the rectifying means draws a current less than the first threshold current.

* * * * *